(12) United States Patent
England

(10) Patent No.: US 6,978,365 B2
(45) Date of Patent: *Dec. 20, 2005

(54) CLIENT-SIDE BOOT DOMAINS AND BOOT RULES

(75) Inventor: Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/013,721

(22) Filed: Dec. 16, 2004

(65) Prior Publication Data

US 2005/0097328 A1     May 5, 2005

Related U.S. Application Data

(60) Continuation of application No. 10/818,892, filed on Apr. 6, 2004, which is a division of application No. 09/459,242, filed on Dec. 10, 1999, now Pat. No. 6,757,824.

(51) Int. Cl.⁷ ............................................... H04L 9/00
(52) U.S. Cl. ...................................... 713/156; 713/175
(58) Field of Search ............................ 713/156, 2, 200

(56) References Cited

U.S. PATENT DOCUMENTS

| | | |
|---|---|---|
| 4,827,508 A | 5/1989 | Shear |
| 4,969,189 A | 11/1990 | Ohta et al. |
| 4,977,594 A | 12/1990 | Shear |
| 5,023,907 A | 6/1991 | Johnson et al. |
| 5,050,213 A | 9/1991 | Shear |
| 5,140,634 A | 8/1992 | Guillou et al. |
| 5,276,311 A | 1/1994 | Hennige |
| 5,335,334 A | 8/1994 | Takahashi et al. |
| 5,410,598 A | 4/1995 | Shear |
| 5,473,690 A | 12/1995 | Grimonprez et al. |
| 5,473,692 A | 12/1995 | Davis |
| 5,491,827 A | 2/1996 | Holtey |
| 5,544,246 A | 8/1996 | Mandelbaum et al. |
| 5,557,518 A | 9/1996 | Rosen |
| 5,654,746 A | 8/1997 | McMullan, Jr. et al. |
| 5,664,016 A | 9/1997 | Preneel et al. |
| 5,671,280 A | 9/1997 | Rosen |
| 5,721,781 A | 2/1998 | Deo et al. |

(Continued)

FOREIGN PATENT DOCUMENTS

EP          0 695 985 A       2/1996

(Continued)

OTHER PUBLICATIONS

Abadi et al., "Authentication and Delegation with Smart-Cards", Jul. 20, 1992, 30 pages.

(Continued)

Primary Examiner—Kambiz Zand
(74) Attorney, Agent, or Firm—Lee & Hayes, PLLC

(57) ABSTRACT

Each software component loaded for a verified operating system on a client computer must satisfy a set of boot rules for a boot certificate. A verified operating system identifier is created from the boot certificate. The boot certificate is published and signed by a boot authority that attests to the validity of the operating system booted under the boot certificate. Each software component for the operating system is associated with a component certificate published and signed by the same boot authority that signed the boot certificate. The boot rules determine the validity of the software component based on the contents of the component and boot certificates. The client computer can transmit the verified operating system identity and the boot certificate to a server computer, such as a content provider, and the content provider can determine whether to trust the verified operating system with its content.

10 Claims, 11 Drawing Sheets

U.S. PATENT DOCUMENTS

| | | |
|---|---|---|
| 5,745,886 A | 4/1998 | Rosen |
| 5,757,919 A | 5/1998 | Herbert et al. |
| 5,796,824 A | 8/1998 | Hasebe et al. |
| 5,812,662 A | 9/1998 | Hsu et al. |
| 5,812,980 A | 9/1998 | Asai |
| 5,841,869 A | 11/1998 | Merklin et al. |
| 5,872,847 A | 2/1999 | Boyle et al. |
| 5,892,900 A | 4/1999 | Ginter et al. |
| 5,892,902 A | 4/1999 | Clark |
| 5,892,904 A | 4/1999 | Atkinson et al. |
| 5,910,987 A | 6/1999 | Ginter et al. |
| 5,915,019 A | 6/1999 | Ginter et al. |
| 5,917,912 A | 6/1999 | Ginter et al. |
| 5,919,257 A | 7/1999 | Trostle |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,944,821 A | 8/1999 | Angelo |
| 5,949,876 A | 9/1999 | Ginter et al. |
| 5,953,502 A | 9/1999 | Helbig, Sr. |
| 5,958,050 A | 9/1999 | Griffin et al. |
| 5,963,980 A | 10/1999 | Coulier et al. |
| 5,982,891 A | 11/1999 | Ginter et al. |
| 5,991,399 A | 11/1999 | Graunke et al. |
| 5,991,876 A | 11/1999 | Johnson et al. |
| 6,006,332 A | 12/1999 | Rabne et al. |
| 6,009,274 A | 12/1999 | Fletcher et al. |
| 6,009,401 A | 12/1999 | Horstmann |
| 6,026,166 A | 2/2000 | LeBourgeois |
| 6,032,257 A | 2/2000 | Olarig et al. |
| 6,038,551 A | 3/2000 | Barlow et al. |
| 6,073,124 A | 6/2000 | Krishman et al. |
| 6,092,189 A | 7/2000 | Fisher et al. |
| 6,105,137 A | 8/2000 | Graunke et al. |
| 6,112,181 A | 8/2000 | Shear et al. |
| 6,118,873 A | 9/2000 | Lotspeich et al. |
| 6,138,119 A | 10/2000 | Hall et al. |
| 6,148,387 A | 11/2000 | Galasso et al. |
| 6,148,402 A | 11/2000 | Campbell |
| 6,157,721 A | 12/2000 | Shear et al. |
| 6,175,917 B1 | 1/2001 | Arrow et al. |
| 6,185,678 B1 | 2/2001 | Arbaugh et al. |
| 6,185,683 B1 | 2/2001 | Ginter et al. |
| 6,189,100 B1 | 2/2001 | Barr et al. |
| 6,192,473 B1 | 2/2001 | Ryan, Jr. et al. |
| 6,212,636 B1 | 4/2001 | Boyle et al. |
| 6,223,284 B1 | 4/2001 | Novoa et al. |
| 6,229,894 B1 | 5/2001 | Van Oorschot et al. |
| 6,230,285 B1 | 5/2001 | Sadowsky et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,263,431 B1 | 7/2001 | Lovelace et al. |
| 6,272,629 B1 | 8/2001 | Stewart |
| 6,292,569 B1 | 9/2001 | Shear et al. |
| 6,327,652 B1 | 12/2001 | England et al. |
| 6,330,588 B1 | 12/2001 | Freeman |
| 6,338,139 B1 | 1/2002 | Ando et al. |
| 6,341,373 B1 | 1/2002 | Shaw |
| 6,363,486 B1 | 3/2002 | Knapton, III |
| 6,363,488 B1 | 3/2002 | Ginter et al. |
| 6,367,012 B1 | 4/2002 | Atkinson et al. |
| 6,381,741 B1 | 4/2002 | Shaw |
| 6,389,402 B1 | 5/2002 | Ginter et al. |
| 6,389,537 B1 | 5/2002 | Davis et al. |
| 6,427,140 B1 | 7/2002 | Ginter et al. |
| 6,449,367 B2 | 9/2002 | Van Wie et al. |
| 6,477,252 B1 | 11/2002 | Faber et al. |
| 6,477,648 B1 | 11/2002 | Schell et al. |
| 6,480,961 B2 | 11/2002 | Rajasekharan et al. |
| 6,560,706 B1 | 5/2003 | Carbajal et al. |
| 6,609,199 B1 * | 8/2003 | DeTreville .................. 713/172 |
| 6,640,304 B2 | 10/2003 | Ginter et al. |
| 6,820,063 B1 | 11/2004 | England et al. |
| 2002/0007452 A1 | 1/2002 | Traw et al. |
| 2002/0069365 A1 | 6/2002 | Howard et al. |
| 2002/0107803 A1 | 8/2002 | Lisanke et al. |
| 2002/0120936 A1 | 8/2002 | Del Beccaro et al. |
| 2002/0152173 A1 | 10/2002 | Rudd |

FOREIGN PATENT DOCUMENTS

| | | |
|---|---|---|
| GB | 2260629 | 4/1993 |
| WO | WO 99 38070 A | 7/1999 |

OTHER PUBLICATIONS

Murphy et al., "Preventing Policy: Authorization Software May Ease Hollywood's Fear of the Net", Internet World Magazine, Apr. 1, 2000, 3 pages.

"Internet Security: SanDisk and New Microsoft Technology Provide Copy Protected Music for Internet Music Player Market", (Product Annoucement), Edge: Work Group Computing Report, Apr. 9, 1999, 2 pages.

"Phoenix Technologies Partners with Secure Computing in Enterprise Security Marketplace", Jul. 2, 2001, Business Wife, Courtesy of Dialog Text Search, p. 1-2.

Schneier, B., "Applied Cryptography", Applied Cryptography. Protocols, Algorithms and Source Code in C, 1996, p. 574-577.

Lampson et al., "Authentication in Distributed Systems: Theory and Practice", Digital Equipment Corporation, ACM Transactions on Computer Systems, vol. 10, No. 4, Nov. 1992, p. 265-310.

Clark et al., "BITS: A Smartcard Protected Operating System", Communications on the ACm, Nov. 1994, vol. 37, No. 11, p. 66-94.

Yee, Bennet, "Using Secure Coprocessors", School of Computer Science, Carnegie Mellon University, 1994, pp. i-vi, 1-94.

Young, Robbin, "Facing An Internet Security Minefield, Microsoft Hardens NT Server's Defenses", Windows Watcher, Sept. 12, 1997, vol. 7, Issue 9, 8 pages.

* cited by examiner

CLIENT-SIDE BOOT DOMAINS AND BOOT RULES

RELATED APPLICATIONS

This is a continuation application of U.S. patent application Ser. No. 10/818,892, filed Apr. 6, 2004, which is hereby incorporated by reference herein and which is a divisional application of U.S. patent application Ser. No. 09/459,242, filed Dec. 10, 1999, now U.S. Pat. No. 6,757,824.

RELATED APPLICATIONS

This application is related to co-assigned U.S. patent applications titled "System and Method for Authenticating an Operating System to a Central Processing Unit, Providing the CPU/OS with Secure Storage, and Authenticating the CPU/OS to a Third Party" (Ser. No. 09/266,207, filed Mar. 10, 1999), "Loading And Identifying A Digital Rights Management Operating System" (Ser. No. 09/227,611, filed Jan. 8, 1999), "Key-based Secure Storage" (Ser. No. 09/227,568, filed Jan. 8, 1999), "Digital Rights Management" (Ser. No. 09/227,559, filed Jan. 8, 1999), and "Digital Rights Management Operating System" (Ser. No. 09/227,561, filed Jan. 8, 1999).

FIELD OF THE INVENTION

This invention relates generally to computer operating systems, and more particularly to verifying components loaded by an operating system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1997, Microsoft Corporation, All Rights Reserved.

BACKGROUND OF THE INVENTION

More and more content is being delivered in digital form, and more and more digital content is being delivered online over private and public networks, such as Intranets, the Internet and cable TV networks. For a client, digital form allows more sophisticated content, while online delivery improves timeliness and convenience. For a publisher, digital content also reduces delivery costs. Unfortunately, these worthwhile attributes are often outweighed in the minds of publishers by the corresponding disadvantage that online information delivery makes it relatively easy to obtain pristine digital content and to pirate the content at the expense and harm of the publisher.

To prevent their content from being stolen or misused, content providers will download content only to trusted software, and therefore only to subscriber computers that can prove that the software executing on the subscriber computer is trusted. This trust concept is predicated on having a trusted operating system executing on the computer, which, by its nature, only loads trusted components and provides some kind of secure storage. The problem then becomes one of identifying an operating system with such peculiarity that the content provider can make an intelligent decision whether to trust its content to the operating system.

The related application titled "System and Method for Authenticating an Operating System to a Central Processing Unit, Providing the CPU/OS with Secure Storage, and Authenticating the CPU/OS to a Third Party" discloses one embodiment of a unique operating system identifier that is a cryptographic digest of all the software components loaded by the operating system. However, computers contain a myriad different hardware components, and the corresponding supporting software components are frequently updated to add enhancements and fix problems, resulting in a virtually unlimited number of operating system identities. While the content provider can maintain a list of those identities it trusts, or delegate the maintenance of such a list to a third-party, what is needed in the art is a way to reduce the number of trusted operating system identities without limiting the choices of software components available to a user.

SUMMARY OF THE INVENTION

The above-mentioned shortcomings, disadvantages and problems are addressed by the present invention, which will be understood by reading and studying the following specification.

Each software component loaded for a verified operating system on a client computer must satisfy a set of boot rules for a boot certificate. The appropriate boot certificate is selected by the user or by default upon each boot of the computer. A verified operating system identifier is created from the boot certificate. The boot certificate is published and signed by a boot authority that attests to the validity of the operating system booted under the boot certificate. Each software component for the operating system is associated with a component certificate published and signed by the same boot authority that signed the boot certificate. The boot rules determine the validity of the software component based on the contents of the component and boot certificates.

The client computer transmits the verified operating system identity and the boot certificate to a server computer, such as a content provider, and the content provider determines whether to trust the verified operating system with its content. Downloaded data is secured on permanent storage through a key derived from the verified operating system identifier. The boot certificate, component certificates, and secured content define the boot domain.

A combination of two or more boot components can be used to boot a verified operating system. Updating of the boot and component certificates, the underlying components, and the changing of the verified operating system identity and its affect on the boot domain are also described.

Because a content provider must only decide which boot authorities, and which boot certificates from those authorities, to trust, the content provider must keep track of only a small number of identities. The client computer is restricted only in that components loaded into a verified operating system must be attested to by one of the boot authorities trusted by the content provider. The client computer can operate under an unverified operating system but data stored under a verified boot domain will not be accessible.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described for use with the Microsoft Corporation "WINDOWS" family of operating system. Finally, in the fifth section, a conclusion of the detailed description is provided.

Hardware and Operating Environment

Figure 1A:
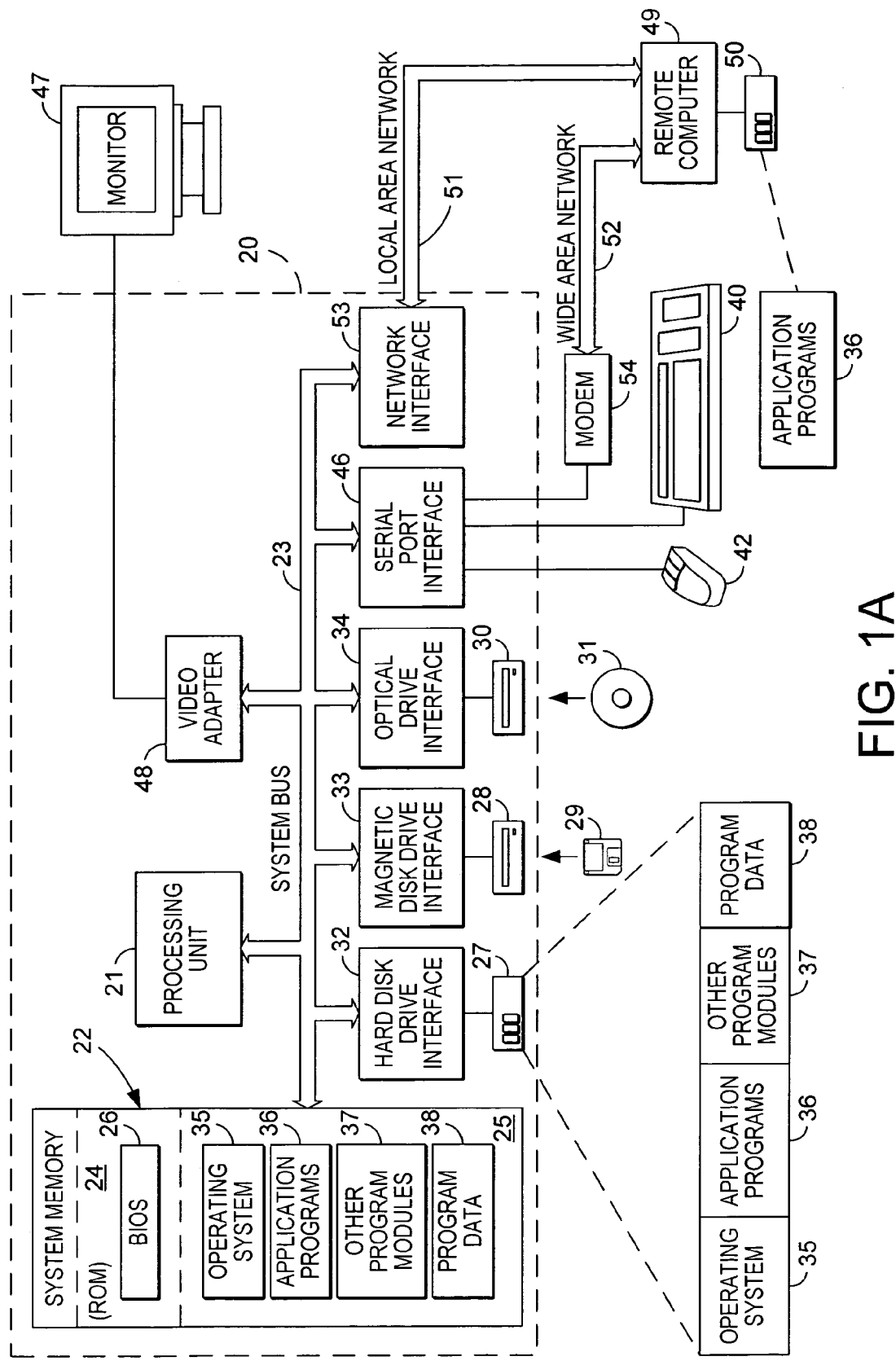
FIG. 1A is a diagram of the hardware and operating environment in conjunction with which embodiments of the invention may be practiced.

FIG. 1A is a diagram of the hardware and operating environment in conjunction with which embodiments of the invention may be practiced. The description of FIG. 1A is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1A for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1A include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Figure 1B:
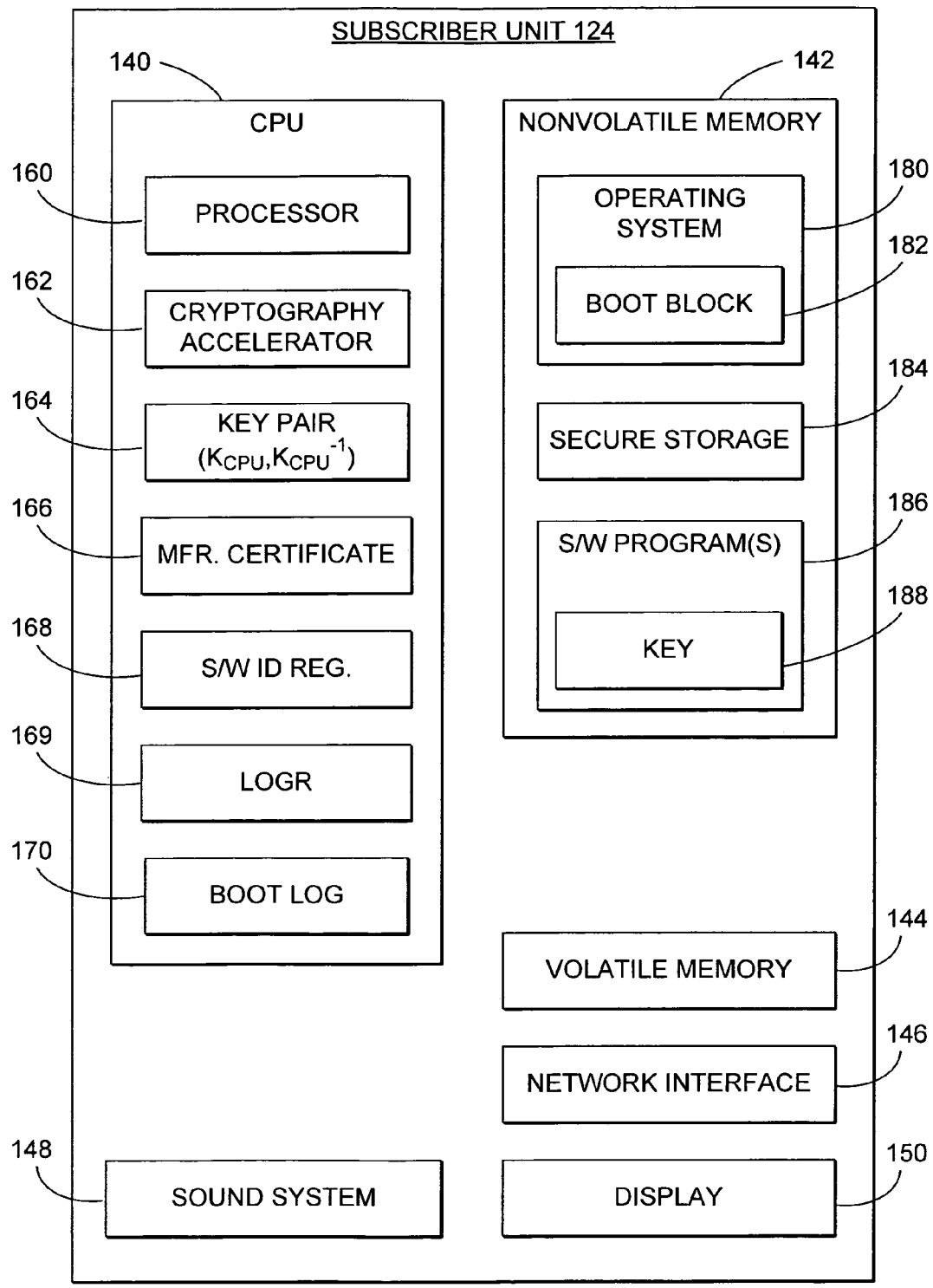
FIG. 1B is a diagram of a client computer for use with exemplary embodiments of the invention.

One exemplary embodiment of a suitable client computer is described in the related application titled "System and Method for Authenticating an Operating System to a Central Processing Unit, Providing the CPU/OS with Secure Storage, and Authenticating the CPU/OS to a Third Party," and illustrated in FIG. 1B as subscriber unit 124. The CPU 140 in the subscriber unit 124 is able to authenticate the identity of the boot block and OS components that have been loaded into the computer, and to provide quoting and secure storage operations based on this identity as briefly described next. Full descriptions of various embodiments for the subscriber unit 124 are provided in the related application.

The CPU 140 has a processor 160 and also can have a cryptographic accelerator 162. The CPU 140 is capable of performing cryptographic functions, such as signing, encrypting, decrypting, and authenticating, with or without the accelerator 162 assisting in intensive mathematical computations commonly involved in cryptographic functions.

The CPU manufacturer equips the CPU 140 with a pair of public and private keys 164 that is unique to the CPU. For discussion purpose, the CPU's public key is referred to as "$K_{CPU}$" and the corresponding private key is referred to as "$K_{CPU}^{-1}$". Other physical implementations may include storing the key on an external device to which the main CPU has privileged access (where the stored secrets are inaccessible to arbitrary application or operating systems code). The private key is never revealed and is used only for the specific purpose of signing stylized statements, such as when responding to challenges from a content provider, as is discussed below.

The manufacturer also issues a signed certificate 166 testifying that it produced the CPU according to a known specification. Generally, the certificate testifies that the manufacturer created the key pair 164, placed the key pair onto the CPU 140, and then destroyed its own knowledge of the private key "$K_{CPU}^{-1}$". In this way, only the CPU knows the CPU private key $K_{CPU}^{-1}$; the same key is not issued to other CPUs and the manufacturer keeps no record of it. The certificate can in principle be stored on a separate physical device associated with the processor but still logically belongs to the processor with the corresponding key.

The manufacturer has a pair of public and private signing keys, $K_{MFR}$ and $K_{MFR}^{-1}$. The private key $K_{MFR}^{-1}$ is known only to the manufacturer, while the public key $K_{MFR}$ is made available to the public. The manufacturer certificate 166 contains the manufacturer's public key $K_{MFR}$, the CPU's public key $K_{CPU}$, and the above testimony. The manufacturer signs the certificate using its private signing key, $K_{MFR}^{-1}$, as follows:

Mfr. Certificate=($K_{MFR}$, Certifies-for-Boot, $K_{CPU}$), signed by $K_{MFR}^{-1}$ The predicate "certifies-for-boot" is a pledge by the manufacturer that it created the CPU and the CPU key pair according to a known specification. The pledge further states that the CPU can correctly perform authenticated boot procedures, as are described below in more detail. The manufacturer certificate 166 is publicly accessible, yet it cannot be forged without knowledge of the manufacturer's private key $K_{MFR}^{-1}$.

A chain of certificates can be extended from the manufacturer's certificate using intermediate certificates and additional key pairs. When verification is performed using an intermediate certificate in the chain instead of the manufacturer's certificate, the frequency of use of the important "root" key pairs, $K_{CPU}/K_{CPU}^{-1}$ and $K_{MFR}/K_{MFR}^{-1}$, is greatly reduced and hence the root keys are less likely to be stolen.

The CPU 140 has an internal software identity register (SIR) 168, which contains the identity of an authenticated operating system 180 or a predetermined false value (e.g., zero) if the CPU determines that the operating system 180 cannot be authenticated. The operating system (OS) 180 is stored in the memory 142 and executed on the CPU 140. The operating system 180 has a block of code 182 that is used to authenticate the operating system to the CPU during the boot operation. The boot block 182 uniquely determines the operating system, or class of operating systems (e.g. those signed by the same manufacturer).

System Level Overview

A system level overview of the operation of an exemplary embodiment of the invention is described by reference to FIG. 2. A subscriber computer 200, such as client computer 20 in FIG. 1A, is connected to a content provider server computer 220, such as remote computer 49, through a wide-area network, such as WAN 52. Processes performed by the components of the subscriber computer 200 and the content provider 220 are illustrated by arrows in FIG. 2. Many of these processes incorporate either public/private key pairs, digital signatures, digital certificates, and/or encryption algorithms, or a combination of these standard cryptographic functions. Such functions are assumed to be provided by the CPU of the subscriber computer in the descriptions that follow, but can be provided by other well-known cryptographic mechanisms as will be immediately understood by one skilled in the art.

Figure 2:
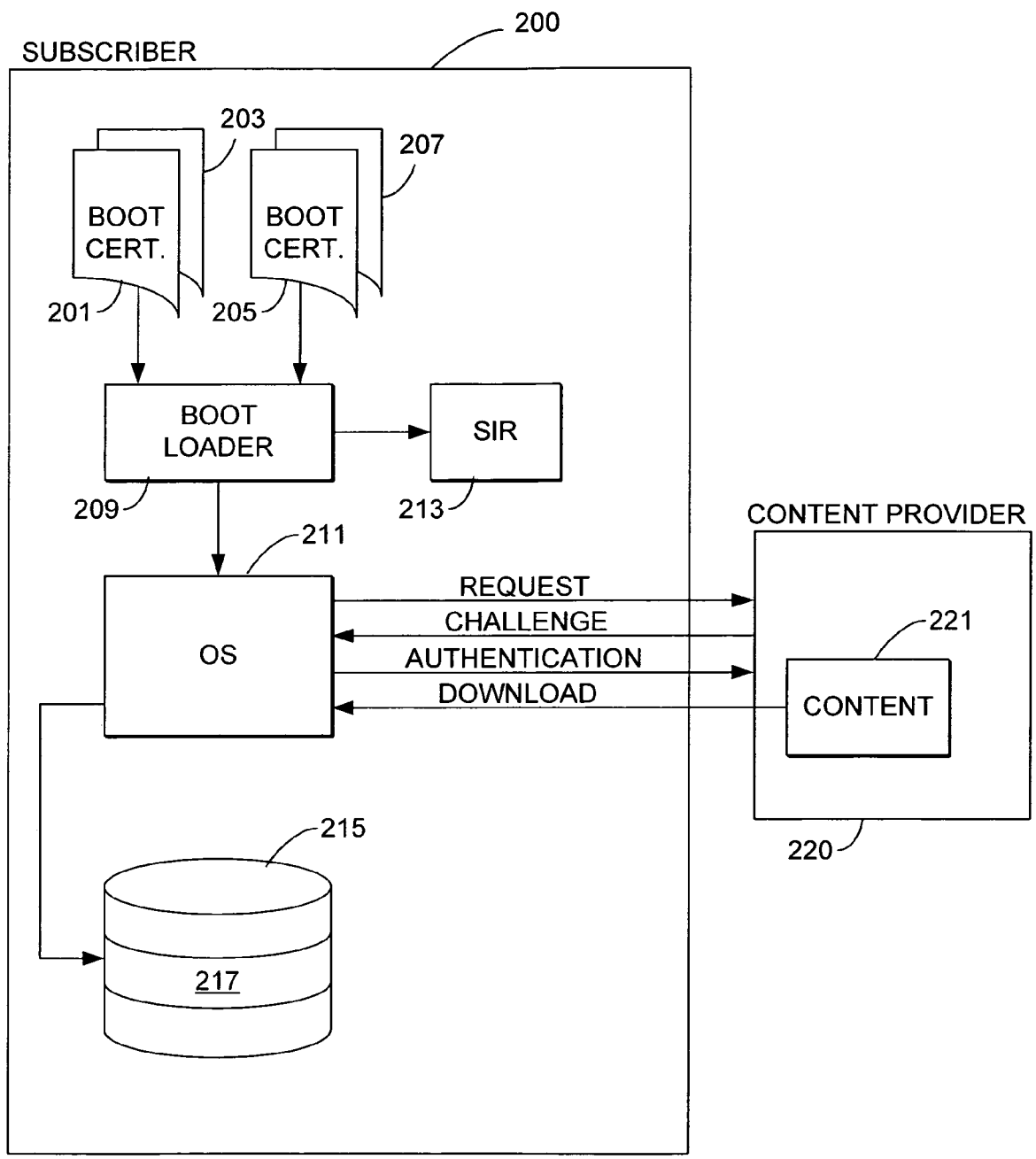
FIG. 2 is a diagram illustrating a system-level overview of an exemplary embodiment of the invention.

In the exemplary embodiment illustrated in FIG. 2, component certificates and boot certificates are used in combination to prove the identity of an operating system executing on the subscriber computer 200 to the content provider 220. Each component certificate is published and signed by a boot authority, using a private key, to indicate that the boot authority attests to the validity and security of the corresponding component. Each boot authority also publishes a boot certificate that contains the public key necessary to verify the signature on the component certificate. When the client computer 200 is booted, a particular combination of boot authorities is chosen to verify the loaded components. Only two component certificates and two boot certificates are shown in FIG. 2 for the sake of clarity in the following discussion. One of skill in the art will readily recognize that, in practice, more than two component certificates will be typically used, and that a different number of boot certificates is equally applicable The boot block (the basic components) for the operating system 211 is associated with component certificate 205, which is signed by the operating system vendor and verified using a boot certificate 201 published by the vendor. An additional software component, such as a hardware device driver, required to operate the computer 200 is associated with component certificate 207. The software component's component certificate 207 is signed by an independent boot authority and verified using the boot certificate 203 published by the independent boot authority.

When the client computer 200 is booted, a boot loader 209 for the operating system 211 verifies the component certificate for each component to be loaded against the boot certificates 201, 203. The identity for the resulting operating system 211 is a cryptographic digest of the combination of the boot block and the boot certificates 201, 203, and is recorded in an internal software identity register (SIR) 213, as explained previously for SIR 168 in FIG. 1B. If a component that cannot be verified is loaded, the identity is set to a default value indicating an unverified operating system.

When the subscriber computer 200 requests download of content 221 from provider 220, the content provider 220 transmits a challenge message ("nonce") to the subscriber computer 200 requesting the boot certificates used to verify the components of the current operating system 211. The subscriber computer 200 transmits an authentication message containing the boot certificates 201, 203, the current value of the SIR 213, and the nonce. The subscriber computer attests to the identity in the SIR 213 by signing the value with the private key of its CPU.

The content provider 220 examines the certificates 201, 203 and the identity to determine whether it should establish a trust relationship with the subscriber computer 200. If so, the content provider 220 downloads the content to the subscriber computer 200. If the content is to be permanently stored on the subscriber computer 200, the operating system 211 writes the content to a storage device 215 and keys the access of the stored content, or "secret," 217 to the identity to prevent unauthorized access to the content. Device 215 is illustrated in FIG. 2 as a disk drive but such illustration is not intended to limit the range of devices that can serve as secured storage.

Figure 3:
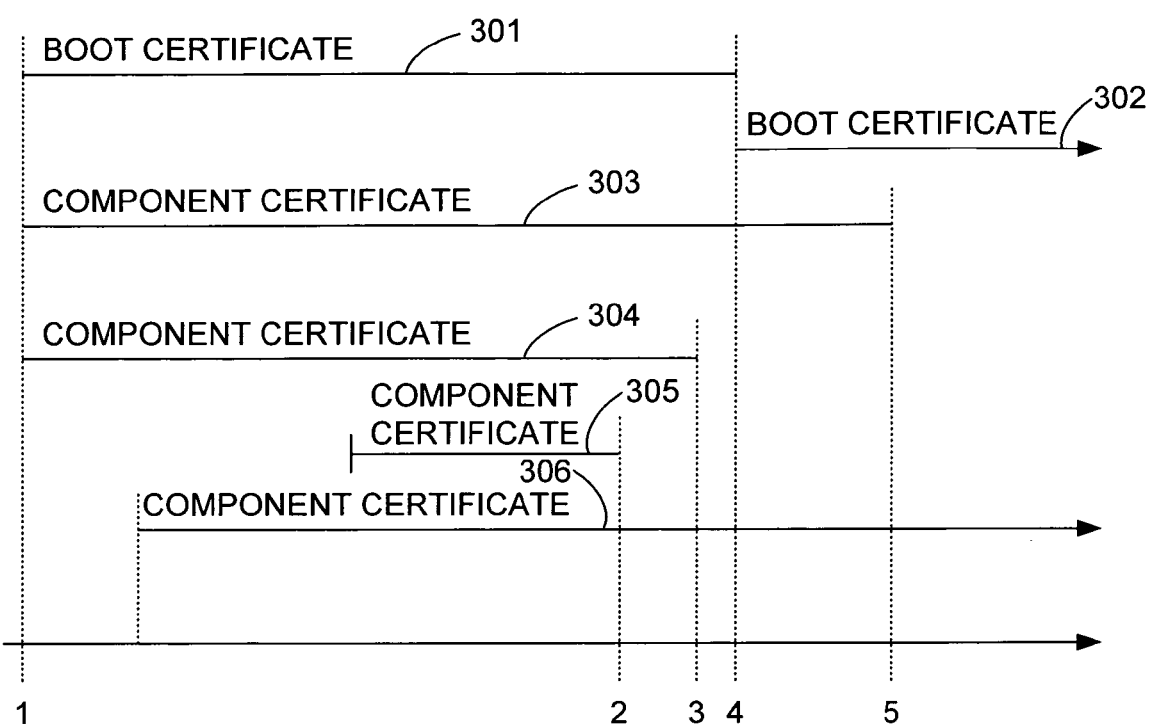
FIG. 3 is a time line diagram illustrating interactions between boot and component certificates used the exemplary embodiment of the invention shown in FIG. 2.

In an exemplary embodiment, each component certificate is valid for a finite period of time, and each boot certificate has an issue date. The interaction between the certificates is based on relative dates as illustrated using a time line in FIG. 3. Boot certificate 301 has an issue date of time mark 1 and boot certificate 302 has an issue date of time mark 4. Component certificate 303 expires at time mark 5, component certificate 304 at time mark 3, component certificate 305 at time mark 2, and component certificate 306 at time mark 6. When the subscriber computer 200 is booted any time between time marks 1 and 4, it checks the expiration dates of each component certificate for a component to be loaded against the issue date of the boot certificate. As long as the component certificate is valid as of the issue date, the component will be loaded. Thus, the components associated with component certificates 303, 304, 305, 306 are always loaded when using boot certificate 301 and the computer will always be able to be booted into a verified operating system.

When booting with boot certificate 302, however, the components associated with component certificates 304, 305 cannot be verified since their valid periods have expired before the issue date of boot certificate 302. If these components must be loaded, the identity of the operating system is set to the value for an unverified operating system. New component certificates are required to load the components in a verified operating system under the boot certificate 302. The process of obtaining a new component certificate is handled automatically by the operating system and is described in the next section.

Because a particular version of a component can be discovered to have a vulnerability before the expiration date of its associated component certificate, an alternate embodiment of the invention associates a revocation list with each boot certificate. If a component appears in the revocation list, the boot certificate will not verify the component until an updated version of the component is obtained. As before, if an unverified component is loaded, the identity is set to the unverified value. In one embodiment, the revocation list also contains an on-line address (URL) for the updated version of the component so the operating system can automatically obtain the new version as described in the next section. One exemplary embodiment of a revocation list in which each vulnerable component is identified by its name and version or by its cryptographic digest is described in further detail below.

If the content provider refuses to download content because one or more of the boot certificates are considered out-dated, the current operating system can obtain later-issued boot certificates to be used on subsequent boots under the newer boot certificates. Because existing content is secured through the identity of the operating system, booting with the new boot certificates will cause that content to be inaccessible. Therefore, the current operating system restores the content using the new identity before the system is rebooted. The process of obtaining later-issued boot certificates and re-securing content is also described in the next section.

The system level overview of the operation of an exemplary embodiment of the invention has been described in this section of the detailed description. A boot domain is created on a client, subscriber computer, which is defined by boot certificates, component certificates, and stored secrets. Software components to be loaded in the subscriber computer are verified using the certificates in accordance with specified boot rules. An operating system identity is created that reflects the boot certificates used to verify the components. A content provider determines whether to trust the operating system based on the operating system identity and the boot certificates. While the invention is not limited to any particular combination of boot and component certificates, for sake of clarity a simplified operating system using two boot certificates and two component certificates has been described.

Methods of an Exemplary Embodiment of the Invention

In the previous section, a system level overview of the operation of an exemplary embodiment of the invention was described. In this section, the particular methods performed by the client, or subscriber computer, of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media).

Figure 4:
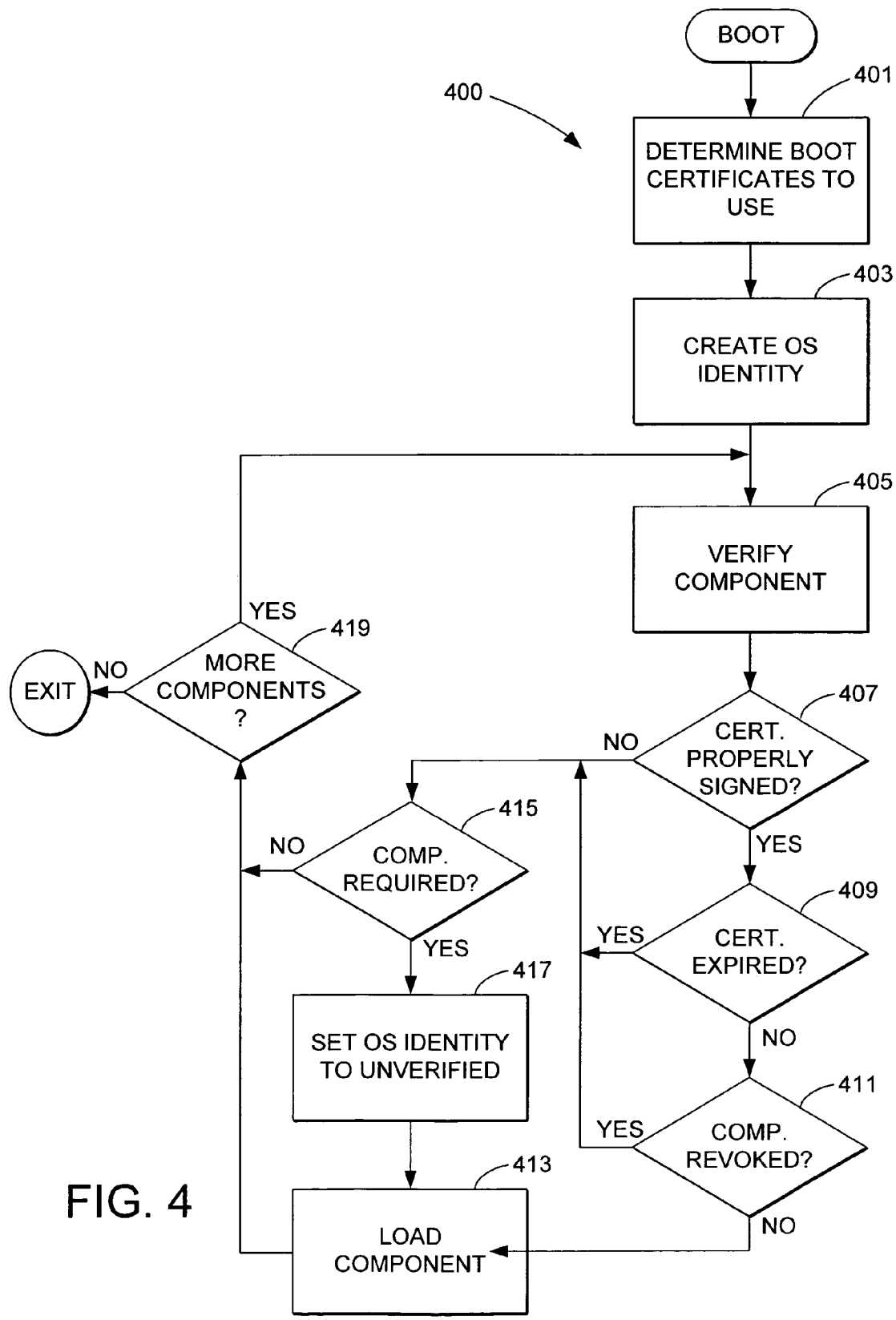
FIG. 4 is a flowchart of a method to be performed by a client when booting according to an exemplary embodiment of the invention.

Referring first to FIG. 4, a flowchart of a method to be performed by a subscriber computer, according to an exemplary embodiment of the invention is shown. This method is inclusive of the acts required to be taken as part of the boot process. When the boot process begins, a boot manager presents the user with a choice of boot certificates that can be used to verify the operating system components (block 401). The user chooses the desired boot certificate or certificates, and the boot loader creates the verified operating system identity based on the boot block and the chosen boot certificates (block 403). Each component that is to be loaded is verified by comparing its component certificate against one of the boot certificates (block 405). The verification process checks the signature on the component certificate (block 407), the expiration date of the component certificate (block 409), and the revocation list (block 411) to determine if the component can be loaded. If the component certificate passes all three tests, i.e., satisfies the boot rules, then the corresponding component is loaded (block 413).

If the component certificate fails to satisfy one of the boot rules, the boot loader presents the user with the choice of loading the corresponding component and booting into an unverified operating system, or not loading the component (block 415). If the component is required, the boot loader sets the identity of the operating system to a value indicating an unverified operating system (block 417) and loads the component (block 413). If the user chooses not to load the component, the verified identity is preserved.

The boot process proceeds according to the boot rules until all components have been loaded (block 419).

Figure 5:
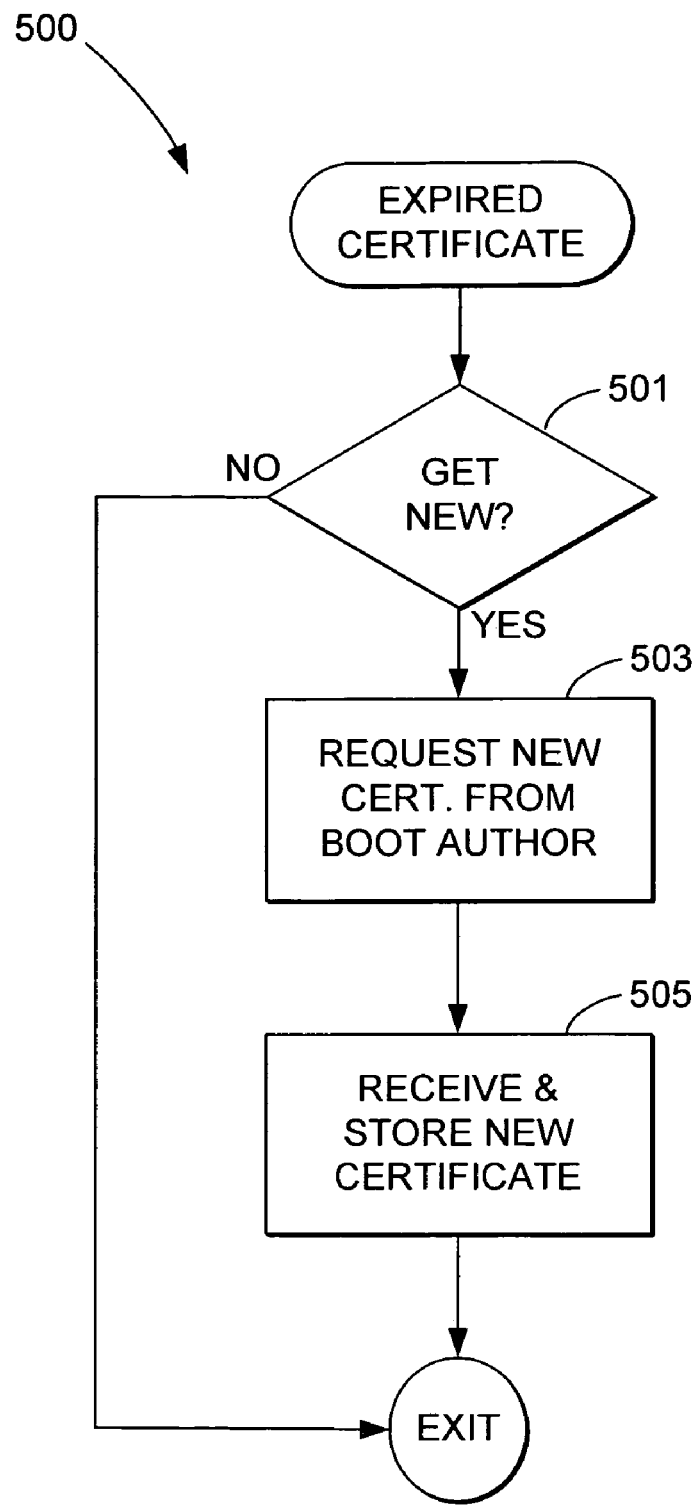
FIG. 5 is a flowchart of a method to be performed by a client in obtaining a new component certificate according to an exemplary embodiment of the invention.
Figure 6:
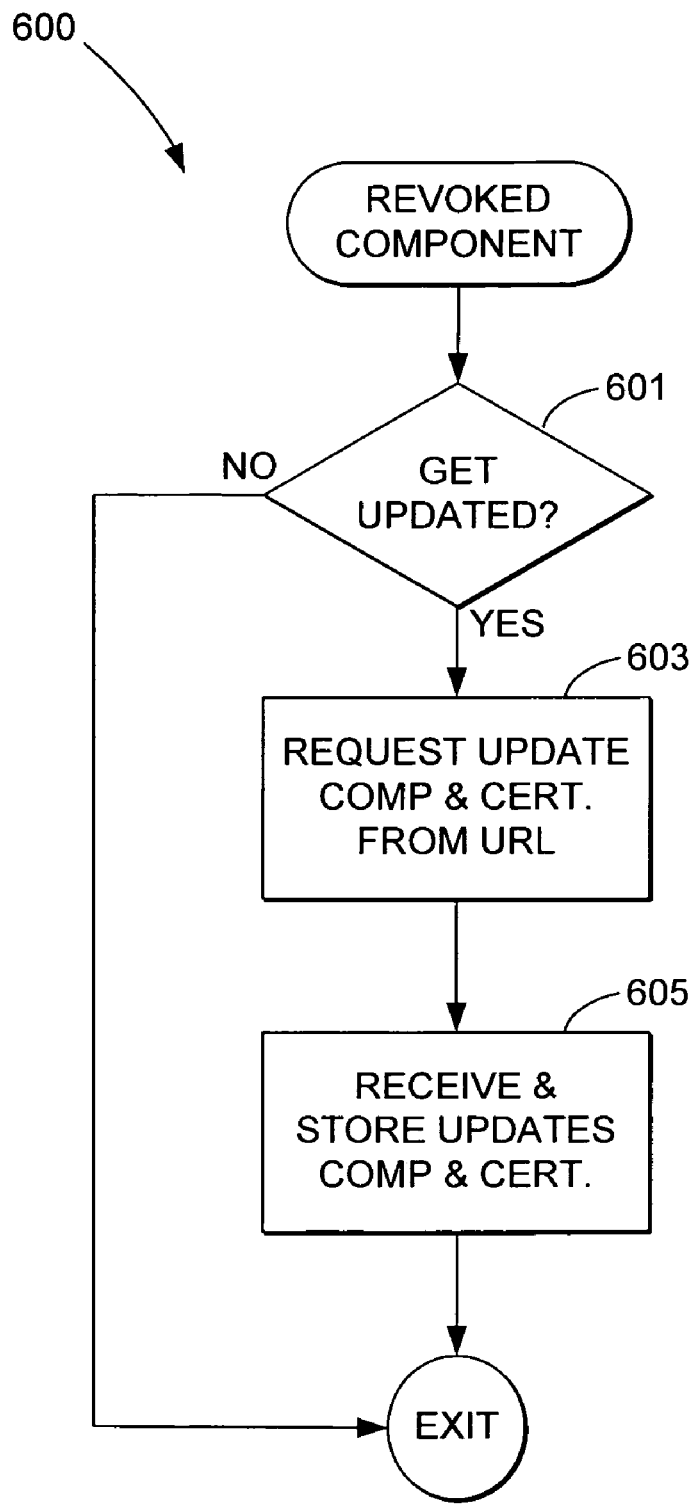
FIG. 6 is a flowchart of a method to be performed by a client in obtaining an updated component certificate to an exemplary embodiment of the invention.

When the operating system is completely booted, if one or more of the components could not be verified the user is given the opportunity to obtain either valid component certificates or updated components as illustrated in FIGS. 5 and 6, respectively.

If the component certificate has expired and the user chooses get a new certificate (block 501 in FIG. 5), the operating system requests the new component certificate from the boot authority that signed the expired certificate (block 503). Upon receipt, the new component certificate is stored in place of the expired certificate (block 505) for use upon subsequent boots.

If the version of the component is listed in the revocation list and the user chooses to obtain an updated version (block 601 in FIG. 6), the operating system requests the updated version from a download site associated with the component (block 603). In one embodiment, the URL for the site is stored in the revocation list. A new component certificate for the updated version is also downloaded. The updated component and new component certificate are stored for verification and loading upon the next boot (block 605).

Figure 7A:
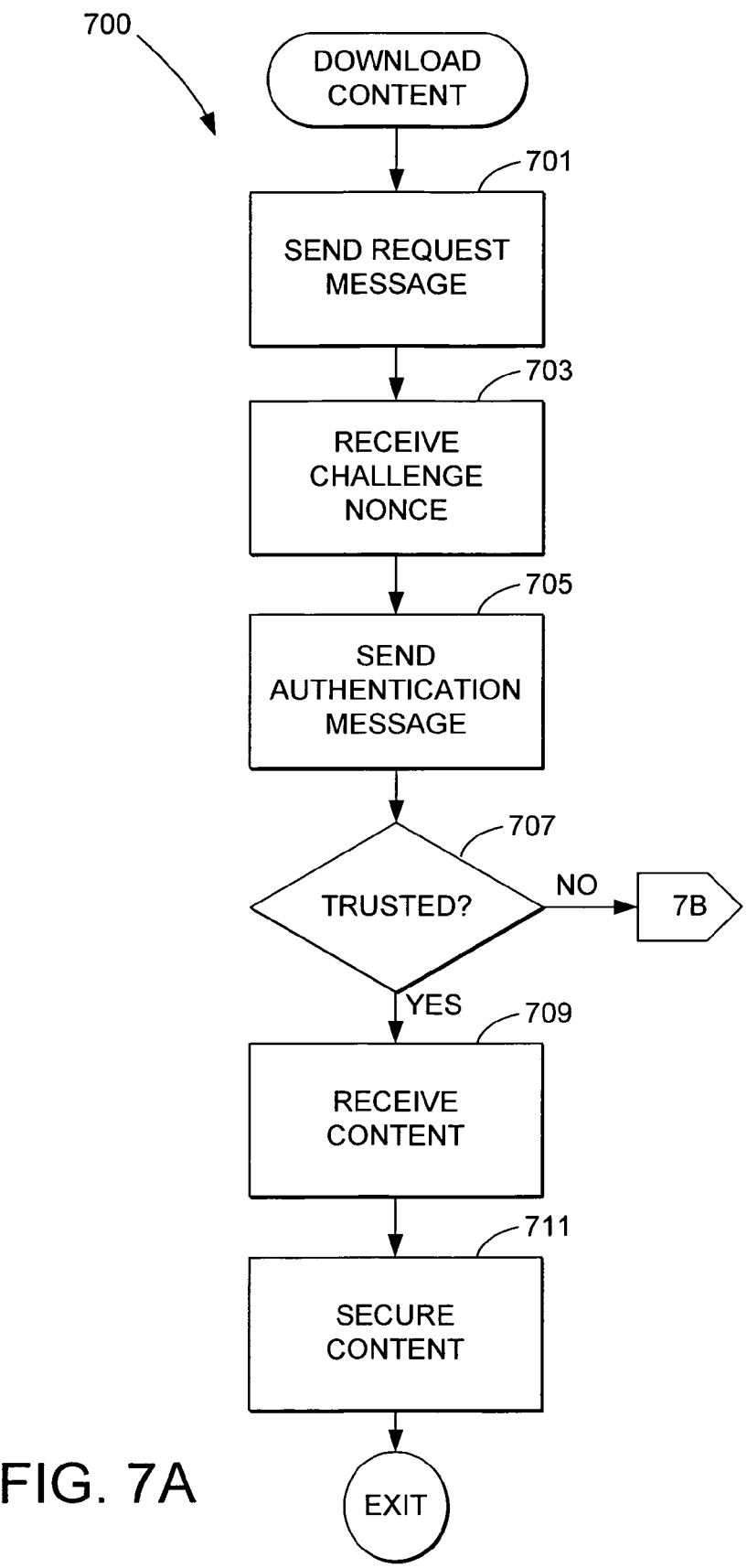
FIGS. 7A and 7B are flowcharts of a method to be performed by a client in obtaining downloaded content according to an exemplary embodiment of the invention.
Figure 7B:
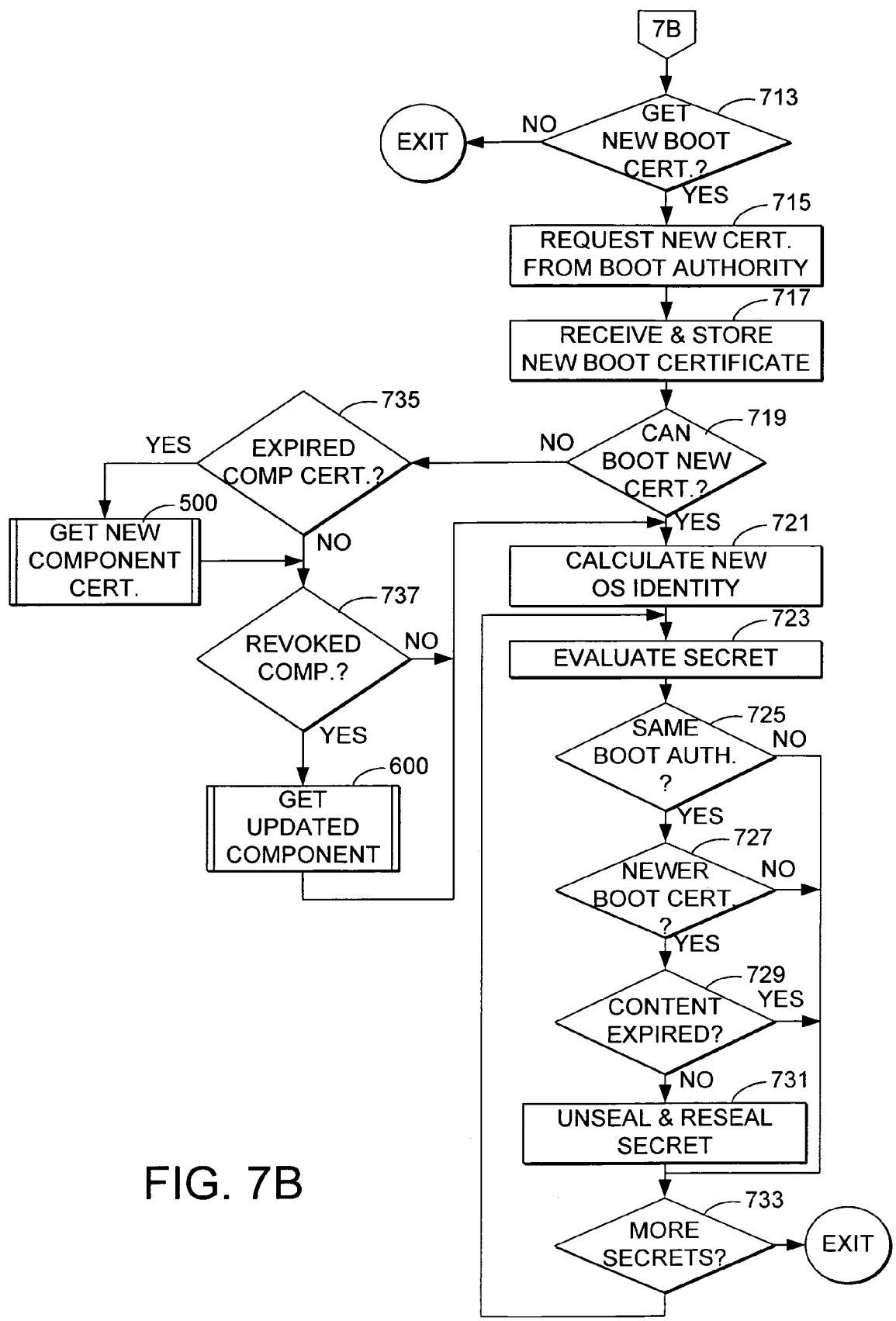

FIGS. 7A and 7B illustrate the processes performed by the subscriber computer in requesting content from a provider. The subscriber computer sends a request message to the provider (block 701) and receives a challenge nonce in response (block 703). The subscriber computer sends an authentication message containing the boot certificate(s), the operating system identity, and the nonce back to the provider (block 705).

If the provider trusts the operating system based on the boot certificate(s) and operating system identity (block 707), it downloads the content to the subscriber computer (block 709), which secures the content on permanent storage based on the operating system identity (block 711).

If the provider determines that the boot certificate(s) used to verify the components are out-dated, the subscriber computer presents the user with the opportunity to obtain newer boot certificate(s) (block 713). The subscriber computer requests the newer boot certificate(s) from the corresponding boot authorities (block 715) and stores the new boot certificates without overwriting the older versions (block 717).

The current operating system determines if the operating system defined by the new boot certificate(s) will boot by verifying each component certificate signed by the boot authorities that published the new boot certificate(s) (block 719). The new operating system can fail because one or more of the component certificates have expired when compared to the new boot certificate(s) (block 735), or because one or more of the components are versions listed in the revocation list associated with the new boot certificate(s) (block 737). New component certificates are obtained (block 500) using the process described above in conjunction with FIG. 5; updated components are obtained (block 600) using the process described above in conjunction with FIG. 6.

When the current operating system determines the new operating system will boot, it creates a new operating system identity based on the new boot component(s) (block 721). Because each operating system identity controls the secrets in the associated boot domain, a new boot domain must be created for the new operating system identity. Each secret is evaluated to determine if it will be part of the new boot domain (block 723). Three rules govern the choice of secrets for the new boot domain: the new boot certificate(s) must be from the boot authorities as the current boot certificate(s) (block 725), the new boot certificate(s) must be issued after the current boot certificate(s) (block 727), and the content must not have not expired before the issue date of the new boot certificate(s) (block 729). A qualifying secret is unsealed using the current operating system identity, a copy made of the content, and the copy is re-sealed using the new operating system identity (block 731). The process continues until all appropriate secrets have been sealed in the new boot domain (block 733). The next time the subscriber computer is booted under the particular boot certificate combination, the new boot certificate(s) will take effect and the secrets in the new boot domain will be accessible. One of skill in the art will readily appreciate that this procedure can be automated as part of the normal operating system update process.

In one embodiment, the secrets in the old boot domain are deleted upon the first successful boot under the new boot certificate(s). In an alternate embodiment, only expired content is deleted.

The particular methods performed by a client of an exemplary embodiment of the invention have been described. The method performed by the client computer has been shown by reference to flowcharts including all the acts from 400 until 417, from 501 until 505, from 601 until 605, and from 701 until 737.

Microsoft "WINDOWS" Implementation

Figure 8A:
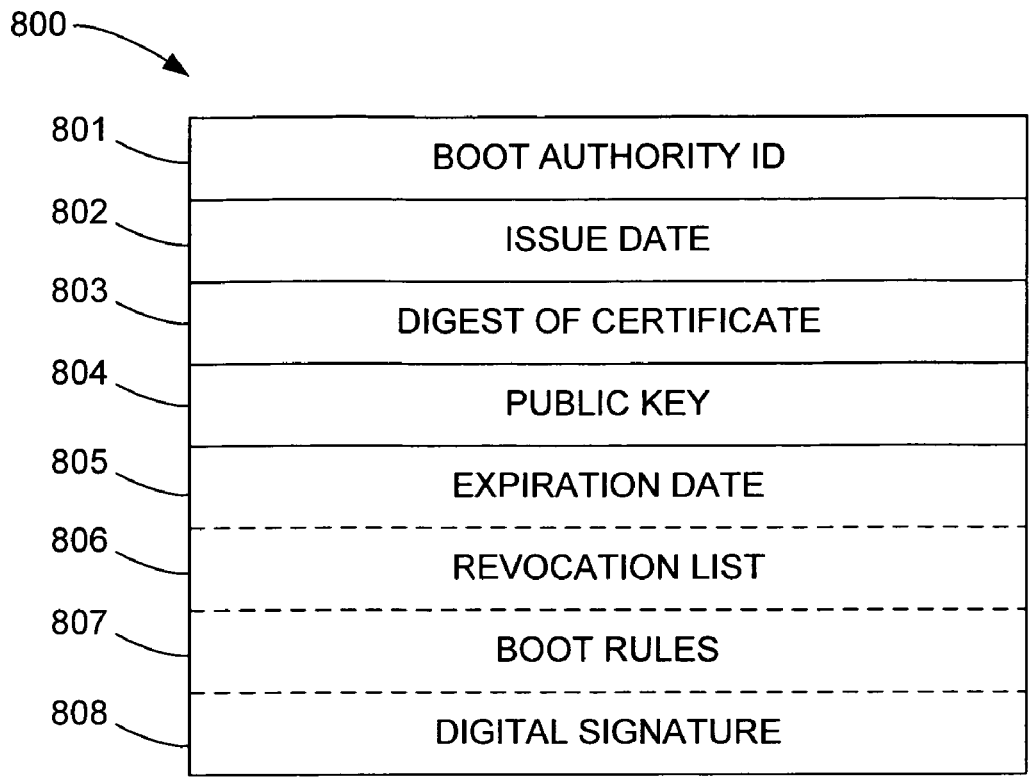
FIG. 8A is a diagram of a boot certificate data structure for use in an exemplary implementation of the invention.
Figure 8B:
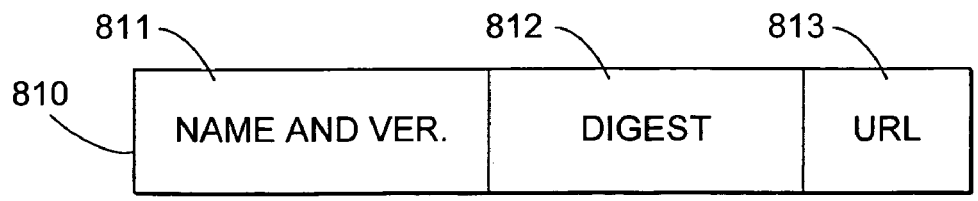
FIG. 8B is a diagram of an entry in a revocation list data structure for use in an exemplary implementation of the invention.
Figure 9:
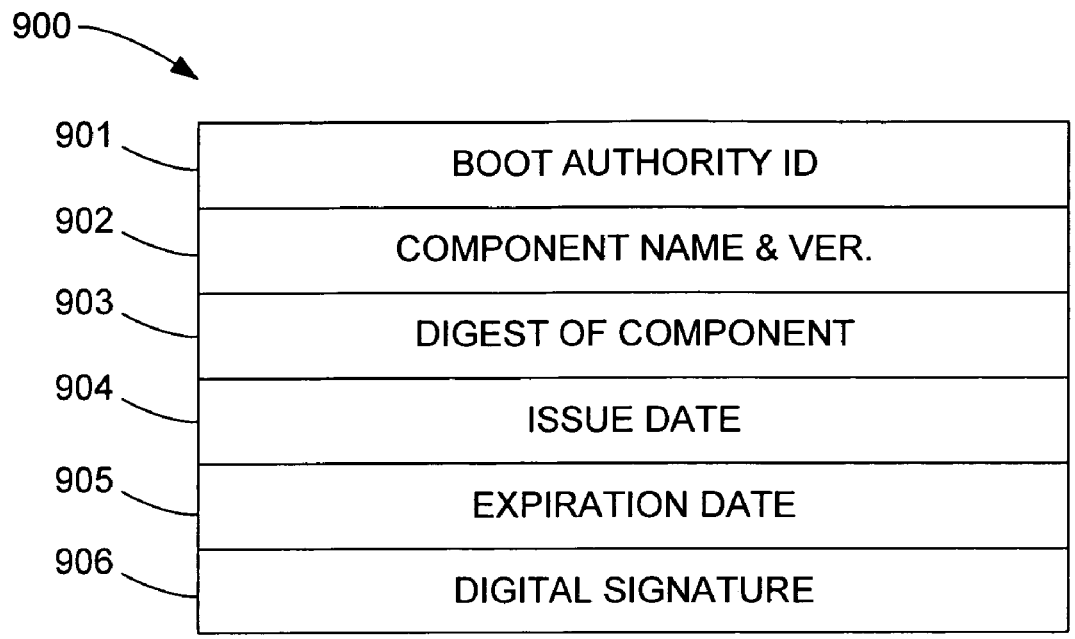
FIG. 9 is a diagram of a component certificate data structure for use in an exemplary implementation of the invention.
Figure 10:
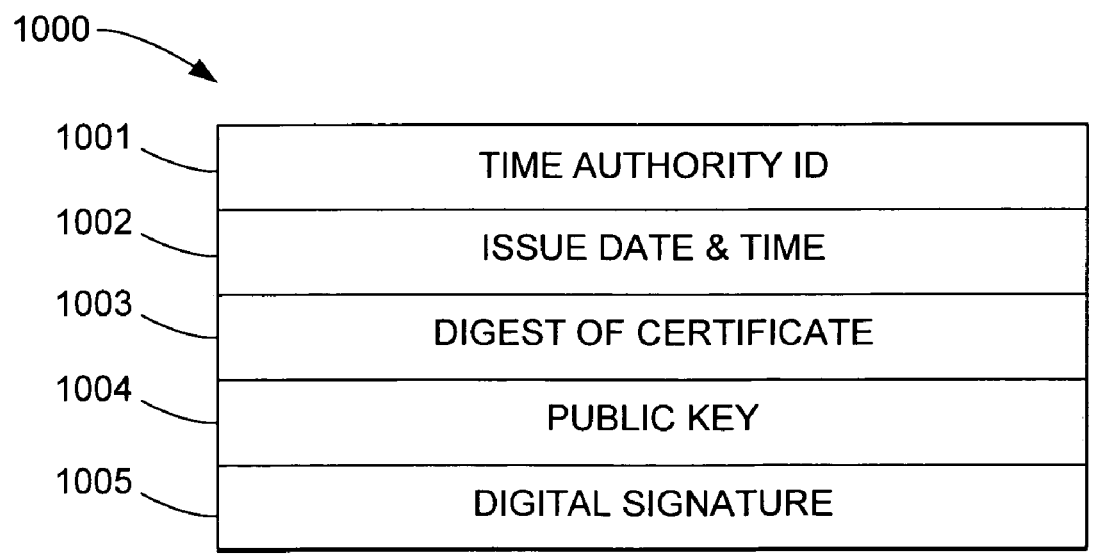
FIG. 10 is a diagram of an time certificate data structure for use in an exemplary implementation of the invention.

In this section of the detailed description, a particular implementation of the invention is described for the Microsoft Corporation "WINDOWS" family of operating systems. Microsoft acts as a boot authority by publishing boot certificates and component certificates for the boot blocks of the various versions of the "WINDOWS" operating system. The "WIDOWS" operating system boot manager and boot loader are extended to operate according to the methods described in the previous section. Exemplary embodiments of a boot certificate and a component certificate for use in the "WINDOWS" operating system implementation are illustrated in FIGS. 8A and 9, respectively. An exemplary embodiment of a revocation list entry is illustrated in FIG. 8B. An exemplary embodiment of an additional certificate, a time certificate, is illustrated in FIG. 10.

Turning first to FIG. 8A, the exemplary embodiment of the boot certificate 800 comprises five constant fields and three optional fields. The constant fields contain an identifier 801 for the boot authority, the issue date 802 of the certificate, the digest 803 of the certificate, the public key 804 of the boot authority, and the digital signature 808 of the boot authority that issued the certificate 800, i.e., the boot authority identified by field 801. The public key 804 is used to verify the digital signature 808 on the boot certificate 800 as well as being used to verify the component certificates signed by the same boot authority.

In one embodiment, the boot certificate 800 includes an expiration date 805 for the boot certificate. The "WINDOWS" operating system uses the expiration date 805 to determine when a new boot certificate is required, without having to be so informed by a content provider.

In an alternate embodiment, the boot certificate 800 includes a revocation list 806. The function of the revocation list has been described in the previous sections. An exemplary embodiment of an entry in the revocation list 806 is illustrated in FIG. 8B. Each entry 810 comprises the name and version 811 of the component that is revoked, a cryptographic digest 812 of the revoked component, and a URL 813 for a download site containing an updated version of the component.

In still another embodiment, the boot certificate 800 includes boot rules 807 in the form of a command script that is executed by the boot process before loading each component signed by the boot authority identified by field 801. In yet another alternate embodiment, the boot rules 807 are a series of operating system commands.

The exemplary embodiment of the component certificate shown in FIG. 9 is implemented by all boot authorities that attest to components for loading in a "WINDOWS" operating system. The component certificate 900 contains the identity 901 of the boot authority, the name and version 902 of the corresponding component, the digest 903 of the component, the issue date 904 of the component certificate, the expiration date 905 of the certificate, and the digital signature 906 of the boot authority. The public key in the boot certificate 800 for the boot authority is used to verify the digital signature 906 of the component certificate.

When the boot certificate 800 contains a revocation list 806, the "WINDOWS" operating system compares name and version 902 and digest 903 in the component certificate against each entry 810 in the revocation list 806 to determine if the component has been revoked. If the component has been revoked, a new version is obtained from the URL address in the entry 810 when the user so chooses.

The "WINDOWS" operating system implementation also uses a time certificate that enables the setting of time limits on content that is of shorter duration than is possible using only the boot certificates. The exemplary embodiment of a time certificate 1000 shown in FIG. 10 contains the same constant fields as the boot certificate 800, except that the time certificate contains an issue time as well as an issue date 1002. Therefore, comparing elements of time certificate 800 with time certificate 1000 reveals: boot authority ID 801 is the same as boot authority 1001; digest of certificate 803 is the same as digest of certificate 1003; public key 804 is the same as public key 1004; and digital signature 808 is the same as digital signature 1005. The time certificate 1000 is folded into the operating system identity along with the boot certificate(s), and is sent to the content provider as part of the authentication message. Use of the time certificate 1000 is equivalent to an attestation by the "WINDOWS" operating system that the computer was booted at a date and time after the issue date and time 1002.

Before downloading quickly expiring content, the content provider determines if the current time certificate, if any, is too old. If so, or if there is no current time certificate, the subscriber computer must acquire a new time certificate and reboot under an operating system identity that includes the new time certificate. Because the time certificate is part of the operating system identity, secrets sealed under the old identity must be evaluated for copying into the new boot domain as described in the previous section for boot certificates. In this case, the expiration of existing content is determined based on the issue date and time of the time certificate. Additionally, any expired content is deleted when the new operating system identity becomes effective.

CONCLUSION

Client boot domains and boot rules have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that any organization can act as a boot authority. It is solely the decision of each individual content provider as to which boot authorities it trusts. Furthermore, those of ordinary skill within the art will appreciate that a component certificate will typically have a shorter validity period than a boot certificate since changing versions of a boot certificate requires unsealing and resealing all secrets in the boot domain.

In addition, although the invention has been described in terms of loading an operating system as a result of powering on a computer, one of skill in the art will recognize that the invention can be used to load an operating system under the control of an already-executing operating system, or to load an operating system into a protected address space on a computer running an unverified operating system.

The terminology used in this application with respect is meant to include all operating system environments in which different software components must be loaded in order for the computer to function.

What is claimed is:

1. One or more computer-readable media having stored thereon instructions for establishing a boot domain on a client computer that, when executed by one or more processors, cause the one or more processors to:
    select a boot certificate associated with the boot domain;
        create a verified operating system identity from the boot certificate; and
    load each one of a plurality of operating system components in accordance with a set of boot rules based on the boot certificate,
    wherein each of the plurality of operating system components is associated with a component certificate and the set of boot rules comprises:
        verifying that each component certificate is signed by a boot authority that issued the boot certificate;
        verifying that each component certificate is valid as of an issue date for the boot certificate; and
        verifying that each component is not listed in a revocation list associated with the boot certificate.

2. The one or more computer-readable media of claim 1, wherein the instructions further cause the one or more processors to:
    obtain a new component certificate to replace a component certificate that is expired as of the issue date of the boot certificate.

3. The one or more computer-readable media of claim 1, wherein the instructions further cause the one or more processors to:
    obtain a new component to replace a component that is listed in the revocation list associated with the boot certificate; and
    obtain the associated component certificate for the new component.

4. One or more computer-readable media having stored thereon instructions for establishing a boot domain on a client computer that, when executed by one or more processors, cause the one or more processors to:
    select a boot certificate associated with the boot domain;
    create a verified operating system identity from the boot certificate;
    load each one of a plurality of operating system components in accordance with a set of boot rules based on the boot certificate;
    secure data for use in the boot domain using a key based on the verified identity of the operating system;
    obtain a new boot certificate;
    create a new verified operating system identity from the new boot certificate; and
    re-secure the data in the boot domain with the new verified operating system identity.

5. The one or more computer-readable media of claim 4, wherein the instructions further cause the one or more processors to:
    create an unverified operating system identity when one of the plurality of operating system components fails the set of boot rules.

6. The one or more computer-readable media of claim 4, wherein to re-secure the data in the boot domain is to:
    verify that the new boot certificate is issued by a boot authority that is the same as the boot authority that issued the boot certificate;
    verify that the new boot certificate is issued at a later date than the boot certificate;
    verify that the data in the boot domain has not expired;
    unseal the data in the boot domain with the verified operating system identity;
    copy the data; and
    seal the copy of the data with the new verified operating system identity.

7. The one or more computer-readable media of claim 4, wherein the instructions further cause the one or more processors to select the boot certificate, to create the verified operating system identity, to load each one of the plurality of operating system components, to secure data for use in the boot domain, to obtain the new boot certificate, to create the new verified operating system identity, and to re-secure the data in the boot domain in a same order as recited in claim 4.

8. A system for establishing a boot domain on a client computer comprising:
    means for selecting a boot certificate associated with the boot domain;
    means for creating a verified operating system identity from the boot certificate;
    means for loading each one of a plurality of operating system components in accordance with a set of boot rules based on the boot certificate;
    means for securing data for use in the boot domain using a key based on the verified identity of the operating system;
    means for obtaining a new boot certificate;
    means for creating a new verified operating system identity from the new boot certificate; and
    means for re-securing the data in the boot domain with the new verified operating system identity.

9. The system of claim 8, further comprising:
    means for creating an unverified operating system identity when one of the plurality of operating system components fails the set of boot rules.

10. The system of claim 8, wherein the means for re-securing the data in the boot domain comprises:
    means for verifying that the new boot certificate is issued by a boot authority that is the same as the boot authority that issued the boot certificate;
    means for verifying that the new boot certificate is issued at a later date than the boot certificate;
    means for verifying that the data in the boot domain has not expired;
    means for unsealing the data in the boot domain with the verified operating system identity;
    means for copying the data; and
    means for sealing the copy of the data with the new verified operating system identity.

* * * * *